(12) United States Patent
Tang et al.

(10) Patent No.: US 12,319,629 B2
(45) Date of Patent: Jun. 3, 2025

(54) SILICON OXYCARBIDE ENVIRONMENTAL BARRIER COATING

(71) Applicant: RTX CORPORATION, Farmington, CT (US)

(72) Inventors: Xia Tang, West Hartford, CT (US); Paul Sheedy, Bolton, CT (US); Tania Bhatia Kashyap, West Hartford, CT (US); Wayde R. Schmidt, Pomfret Center, CT (US); Daniel G. Goberman, East Granby, CT (US)

(73) Assignee: RTX CORPORATION, Farmington, CT (US)

( * ) Notice: Subject to any disclaimer, the term of this patent is extended or adjusted under 35 U.S.C. 154(b) by 6 days.

(21) Appl. No.: 18/476,686

(22) Filed: Sep. 28, 2023

(65) Prior Publication Data
US 2025/0026692 A1 Jan. 23, 2025

Related U.S. Application Data

(62) Division of application No. 16/550,839, filed on Aug. 26, 2019, now Pat. No. 11,802,093, which is a
(Continued)

(51) Int. Cl.
| | |
|---|---|
| *B32B 9/00* | (2006.01) |
| *C04B 35/14* | (2006.01) |
| *C04B 35/195* | (2006.01) |
| *C04B 35/56* | (2006.01) |
| *C04B 35/565* | (2006.01) |
| *C04B 41/87* | (2006.01) |

(52) U.S. Cl.
CPC .............. *C04B 41/87* (2013.01); *B32B 9/005* (2013.01); *C04B 35/14* (2013.01); *C04B 35/195* (2013.01); *C04B 35/5603* (2013.01); *C04B 35/565* (2013.01); *B32B 2255/20* (2013.01); *B32B 2264/102* (2013.01); *B32B 2307/308* (2013.01); *B32B 2307/7265* (2013.01)

(58) Field of Classification Search
None
See application file for complete search history.

(56) References Cited

U.S. PATENT DOCUMENTS

| | | |
|---|---|---|
| 6,497,776 B1 | 12/2002 | Butler et al. |
| 6,541,134 B1 | 4/2003 | Strangman et al. |
| (Continued) | | |

OTHER PUBLICATIONS

Mazo et al., Influence of processing conditions in TEOS/PDMS derived silicon oxycarbide materials. Part 1: Microstructure and properties, Journal of the European Ceramic Society, vol. 33, Issue 6, 2013, pp. 1195-1205 (Year: 2013).*

(Continued)

*Primary Examiner* — Elizabeth Collister
(74) *Attorney, Agent, or Firm* — Carlson, Gaskey & Olds, P.C.

(57) ABSTRACT

An article includes a ceramic-based substrate and a barrier layer on the ceramic-based substrate. The barrier layer includes a matrix of barium-magnesium alumino-silicate or $SiO_2$, a dispersion of silicon oxycarbide particles in the matrix, and a dispersion of particles, of the other of barium-magnesium alumino-silicate or $SiO_2$, in the matrix.

10 Claims, 1 Drawing Sheet

Related U.S. Application Data division of application No. 15/110,523, filed as application No. PCT/US2015/010442 on Jan. 7, 2015, now Pat. No. 10,392,312.

(60) Provisional application No. 61/927,101, filed on Jan. 14, 2014.

(56) References Cited

U.S. PATENT DOCUMENTS

| | | | |
|---|---|---|---|
| 8,039,113 | B2 | 10/2011 | Kirby et al. |
| 8,273,470 | B2 | 9/2012 | Kirby et al. |
| 2005/0042461 | A1 | 2/2005 | Li et al. |
| 2008/0138538 | A1 | 6/2008 | Lewis et al. |
| 2008/0187767 | A1* | 8/2008 | Tang ............... C04B 41/009 |
| | | | 204/192.1 |
| 2009/0184280 | A1 | 7/2009 | Lee |
| 2010/0015396 | A1 | 1/2010 | Johnson et al. |
| 2010/0154422 | A1 | 6/2010 | Kirby et al. |
| 2010/0158680 | A1 | 6/2010 | Kirby et al. |
| 2010/0255260 | A1 | 10/2010 | Lee et al. |
| 2011/0059321 | A1 | 3/2011 | Skoog et al. |
| 2012/0148834 | A1 | 6/2012 | Skoog et al. |
| 2012/0328886 | A1 | 12/2012 | Schmidt et al. |
| 2013/0136915 | A1 | 5/2013 | Naik |
| 2013/0183531 | A1 | 7/2013 | Schmidt et al. |
| 2013/0224471 | A1 | 8/2013 | Sheedy et al. |

OTHER PUBLICATIONS

The International Search Report and Written Opinion for PCT Application No. PCT/US2015/010442, mailed on Aug. 31, 2015.
U.S. Appl. No. 13/603,891, filed Sep. 5, 2012.
U.S. Appl. No. 13/167,425, filed Jun. 23, 2011.
U.S. Appl. No. 13/352,636, filed Jan. 18, 2012.
Walter, S., Suttor, D., Erny, T., Hahn, B., and Greil, P. (1995). Injection moulding of polysiloxane/filler mixtures for oxycarbide ceramic composites. Journal of European Ceramic Society 16 (1996) 387-393.
Renlund, G.M., Prochazka, S. (1990). Silicon oxycarbide glasses: Preparation and chemistry. J. Mater. Res. vol. 6, No. 12, Dec. 1991.
Tyczkowski, J. and Delamar, M. Ultraviolet luminescence of Gd-doped a-SixCyOz: H films fabricated by plasma chemical vapor deposition. Materials Science and Engineering, 146 (2008) 151-156.
International Preliminary Report on Patentability for PCT Application No. PCT/US2015/010442 mailed Jul. 28, 2016.
Supplementary European Search Report for European Patent Application No. 15768808.6 mailed Sep. 7, 2017.

* cited by examiner

SILICON OXYCARBIDE ENVIRONMENTAL BARRIER COATING

CROSS-REFERENCE TO RELATED APPLICATION

This application is a divisional of U.S. application Ser. No. 16/550,839, filed Aug. 26, 2019, which is a divisional of U.S. application Ser. No. 15/110,523, filed on Jul. 8, 2016, which is a national phase entry of International Application No. PCT/US2015010442, filed Jan. 7, 2015, which claims priority to U.S. Provisional Application No. 61/927,101, filed Jan. 14, 2014.

STATEMENT REGARDING FEDERALLY SPONSORED RESEARCH OR DEVELOPMENT

This invention was made with government support under contract number N00014-09-C-0201 awarded by the United States Navy. The government has certain rights in the invention.

BACKGROUND

This disclosure relates to composite articles, such as those used in gas turbine engines.

Components, such as gas turbine engine components, may be subjected to high temperatures, corrosive and oxidative conditions, and elevated stress levels. In order to improve the thermal and/or oxidative stability, the component may include a protective barrier coating.

SUMMARY

An article comprising a ceramic-based substrate according to an example of the present disclosure includes a barrier layer on the ceramic-based substrate. The barrier layer includes a matrix of barium-magnesium alumino-silicate or $SiO_2$ and a dispersion of silicon oxycarbide particles in the matrix. The silicon oxycarbide particles have Si, O, and C in a covalently bonded network, and a dispersion of particles, of the other of barium-magnesium alumino-silicate or $SiO_2$, in the matrix.

In a further embodiment of any of the foregoing embodiments, the barrier layer includes, by volume, 1-30% of the barium-magnesium alumino-silicate particles.

In a further embodiment of any of the foregoing embodiments, the barrier layer includes, by volume, 30-94% of the silicon oxycarbide particles.

In a further embodiment of any of the foregoing embodiments, the barrier layer includes, by volume, 5-40% of the matrix of $SiO_2$.

In a further embodiment of any of the foregoing embodiments, the barrier layer includes, by volume, 1-30% of the barium-magnesium alumino-silicate particles, 5-40% of the matrix of $SiO_2$, and a balance of the silicon oxycarbide particles.

In a further embodiment of any of the foregoing embodiments, the barrier layer includes, by volume, 1-5% of the barium-magnesium alumino-silicate particles.

A further embodiment of any of the foregoing embodiments includes a distinct intermediate layer between the barrier layer and the ceramic-based substrate, the distinct intermediate layer including an intermediate layer matrix of $SiO_2$ and a dispersion of intermediate layer silicon oxycarbide particles in the intermediate layer matrix.

In a further embodiment of any of the foregoing embodiments, the silicon oxycarbide particles in the barrier layer have an average maximum dimension D1 and the intermediate layer silicon oxycarbide particles in the distinct intermediate layer have an average maximum dimension D2, and D2 is less than D1.

In a further embodiment of any of the foregoing embodiments, the distinct intermediate layer includes, by volume, 5-40% of the intermediate layer matrix of $SiO_2$ and a balance of the dispersion of the intermediate layer silicon oxycarbide particles.

In a further embodiment of any of the foregoing embodiments, the matrix of $SiO_2$ is continuous.

In a further embodiment of any of the foregoing embodiments, the silicon oxycarbide particles have a composition $SiO_xM_2C_y$, where M is at least one metal, $x<2$, $y>0$ and $z<1$ and x and z are non-zero.

In a further embodiment of any of the foregoing embodiments, the silicon oxycarbide particles have an average maximum dimension of 1-75 micrometers.

A further embodiment of any of the foregoing embodiments includes a ceramic-based top coat on the barrier layer.

In a further embodiment of any of the foregoing embodiments, the barrier layer consists of the matrix of $SiO_2$, the dispersion of the silicon oxycarbide particles in the matrix, and the dispersion of the barium-magnesium alumino-silicate particles in the matrix.

A composite material according to an example of the present disclosure includes a matrix of barium-magnesium alumino-silicate or SiO and a dispersion of silicon oxycarbide particles in the matrix. The silicon oxycarbide particles have Si, O, and C in a covalently bonded network and a dispersion of particles, of the other of barium-magnesium alumino-silicate or $SiO_2$, in the matrix.

A further embodiment of any of the foregoing embodiments includes, by volume, 1-30% of the barium-magnesium alumino-silicate particles, 5-40% of the matrix of $SiO_2$, and a balance of the silicon oxycarbide particles.

A further embodiment of any of the foregoing embodiments includes, by volume, 1-5% of the barium-magnesium alumino-silicate particles.

In a further embodiment of any of the foregoing embodiments, the matrix of $SiO_2$ is continuous.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
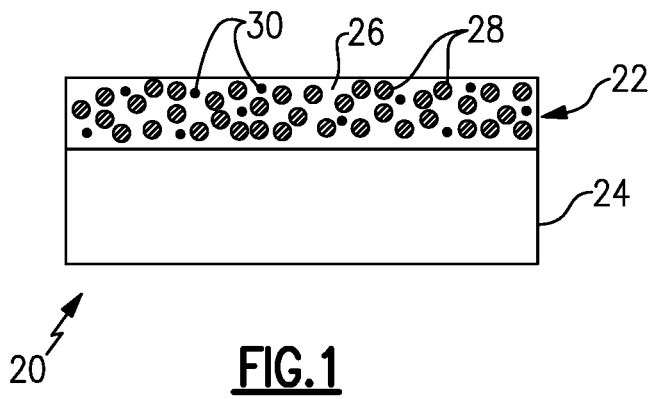
FIG. 1 illustrates an example article having a barrier layer of a composite material that includes barium-magnesium alumino-silicate particles.

FIG. 1 schematically illustrates a representative portion of an example article 20 that includes a composite material 22 that is used as a barrier layer. The article 20 can be a gas turbine engine component, such as but not limited to, an airfoil, a combustor liner panel, a blade outer air seal, or other component that would benefit from the examples herein. In this example, the composite material 22 is used as an environmental barrier layer to protect an underlying substrate 24 from environmental conditions, as well as thermal conditions. As will be appreciated, the composite material 22 can be used as a stand-alone barrier layer, as an outermost/top coat with additional underlying layers, or in combination with other coating under- or over-layers, such as, but not limited to, ceramic-based topcoats.

Figure 2:
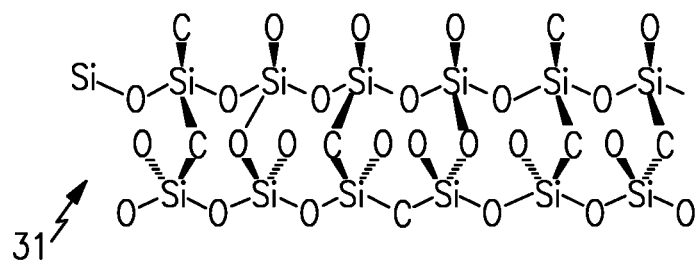
FIG. 2 illustrates a network of silicon oxycarbide.

The composite material 22 includes a matrix of silicon dioxide ($SiO_2$) 26, a dispersion of silicon oxycarbide particles (SiOC) 28 in the matrix 26, and a dispersion of barium-magnesium alumino-silicate particles 30 ("BMAS particles 30"). In an alternative of any of the examples herein, the matrix can be the barium-magnesium alumino-silicate and the dispersion of particles can be silicon dioxide. The silicon oxycarbide particles 28 have silicon, oxygen, and carbon in a covalently bonded network, as shown in the example network 31 in FIG. 2. In one further example, the silicon oxycarbide particles 28 have an average maximum dimension of 1-75 micrometers. In one additional example, an average maximum dimension of the BMAS particles 30 is less than the average maximum dimension of the silicon oxycarbide particles 28.

The network 31 is amorphous and thus does not have long range crystalline structure. The illustrated network 31 is merely one example in which at least a portion of the silicon atoms are bonded to both O atoms and C atoms. As can be appreciated, the bonding of the network 31 will vary depending upon the atomic ratios of the Si, C, and O. In one example, the silicon oxycarbide particles 28 have a composition $SiO_xM_zC_y$, where M is at least one metal, $x<2$, $y>0$, $z<1$, and x and z are non-zero. The metal can include aluminum, boron, transition metals, refractory metals, rare earth metals, alkaline earth metals or combinations thereof.

In one example, the composite material 22 includes, by volume, 1-30% of the BMAS particles 30. In a further example, the composite material 22 includes, by volume, 30-94% of the silicon oxycarbide particles 28. In one further example, the composite material 22 includes, by volume, 5-40% of the matrix 26 of silicon dioxide. In a further example, the composite material 22 includes, by volume, 1-30% of the BMAS particles 30, 5-40% of the matrix 26 of silicon dioxide, and a balance of the silicon oxycarbide particles 28. In any of the above examples, the composite material 22 can include, by volume, 1-5% of the BMAS particles 30.

The barrier layer protects the underlying substrate 24 from oxygen and moisture. For example, the substrate 24 can be a ceramic-based substrate, such as a silicon-containing ceramic material. One example is silicon carbide. The silicon oxycarbide particles 28 and the BMAS particles 30 of the barrier layer function as an oxygen and moisture diffusion barrier to limit the exposure of the underlying substrate 24 to oxygen and/or moisture from the surrounding environment. Without being bound by any particular theory, the BMAS particles 30 enhance oxidation and moisture protection by diffusing to the outer surface of the barrier layer opposite of the substrate 24 and forming a sealing layer that seals the underlying substrate 24 from oxygen/moisture exposure. Additionally, the cationic metal species of the BMAS particles 30 (barium, magnesium, and aluminum) can diffuse into the silicon oxycarbide particles 28 to enhance oxidation stability of the silicon oxycarbide material.

Figure 3:
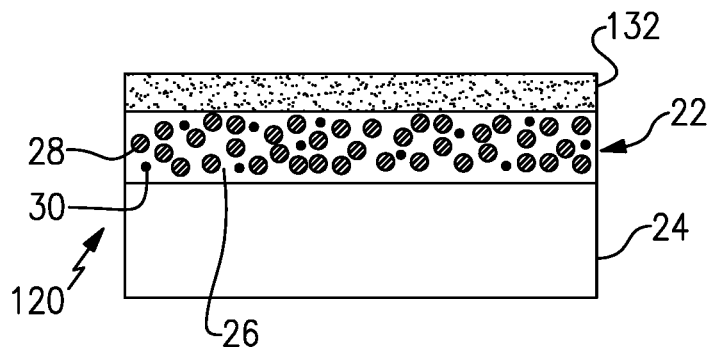
FIG. 3 illustrates another example article having a barrier layer of a composite material that includes barium-magnesium alumino-silicate particles.

FIG. 3 shows another example article 120 that includes the composite material 22 as a barrier layer arranged on the substrate 24. In this example, the article 120 additionally includes a ceramic-based top coat 132 interfaced with the barrier layer. As an example, the ceramic-based top coat 132 can include one or more layers of an oxide-based material. The oxide-based material can be yttria stabilized zirconia, gadolinia stabilized zirconia, or combinations thereof, but is not limited to such oxides.

Figure 4:
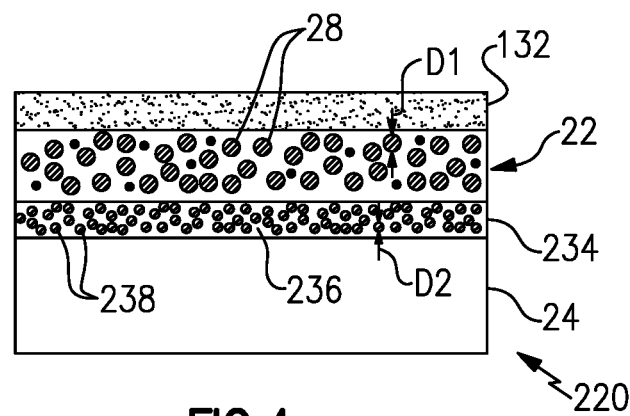
FIG. 4 illustrates another example article having a barrier layer of a composite material that includes barium-magnesium alumino-silicate particles.

FIG. 4 illustrates another example article 220 that is somewhat similar to the article 120 shown in FIG. 3 but includes a distinct intermediate layer 234 interposed between the barrier layer of the composite material 22 and the substrate 24. In this example, the distinct intermediate layer 234 includes an intermediate layer matrix of silicon dioxide 236 and a dispersion of intermediate layer silicon oxycarbide particles 238 in the intermediate layer matrix 236. The intermediate layer silicon oxycarbide particles 238 are similar to the silicon oxycarbide particles 28 in composition but, in this example, the intermediate layer silicon oxycarbide particles 238 have an average maximum dimension (D2) that is less than the average maximum dimension (D1) of the silicon oxycarbide particles 28. The relatively small intermediate layer silicon oxycarbide particles 238 provide a relatively low roughness for enhanced bonding with the underlying substrate 24. The larger silicon oxycarbide particles 28 of the barrier layer provide enhanced blocking of oxygen/moisture diffusion. Thus, in combination, the barrier layer and intermediate layer 234 provide good adhesion and good oxidation/moisture resistance. In one further example, D1 is 44-75 micrometers and D2 is 1-44 micrometers.

In one example, the intermediate layer 234 can include, by volume, 5-40% of the intermediate layer matrix of silicon dioxide 236 and a balance of the intermediate layer silicon oxycarbide particles 238. In further examples, a portion of the BMAS particles 30 from the barrier layer can penetrate or diffuse into the intermediate layer 234, during processing, during operation at high temperatures, or both. In a further example, a seal coat layer of $SiO_2$, with or without BMAS particles, can be provided between the barrier layer and the intermediate layer 234 to provided adhesion and additional sealing. In further examples of any of the compositions disclosed herein, said compositions can include only the listed constituents. Additionally, in any of the examples disclosed herein, the matrix 26 and 236 can be continuous. The two-layer structure can also demonstrate good oxidation protection at 2000-2700° F. for 500 hours or longer as well as good adhesion with the ceramic-based top coat 132.

The barrier layer and/or intermediate layer 234 can be fabricated using a slurry coating method. The appropriate slurries can be prepared by mixing components, such as silicon oxycarbide, barium-magnesium alumino-silicate, and powder of silicon dioxide or colloidal silica (Ludox) in a carrier fluid, such as water. The slurries can be mixed by agitation or ball milling and the resulting slurry can be painted, dipped, sprayed or otherwise deposited onto the underlying substrate 24. The slurry can then be dried at room temperature or at an elevated temperature to remove the carrier fluid. In one example, the slurry is dried and cured at about 200° C. for at least 15 minutes to ensure proper cross-linking of the coating. The green coating can then be sintered at an elevated temperature in air for a selected amount of time. In one example, the sintering includes heating at 1500° C. or greater in an air environment for at least 1 hour.

The bond coat can be prepared using a slurry coating method. Slurries can be prepared by mixing components such as SiOC, BMAS, $SiO_2$ or Ludox (a source colloidal $SiO_2$) and water using agitation or ball milling. Various slurry coating methods such as painting, dipping and spraying can be used to coat ceramic matrix composite (CMC) substrates. Coatings formed from slurry are dried at room temperature and cured at 200° C. for at least 15 minutes. This curing step is critical to ensure proper cross-linking of the coating. Failure to do so will result in coating damage during coating of subsequent layers. This coating process can be repeated until all layers are coated. The bond coat is finally sintered at 1500° C. in air for 1 hour.

In one further example, a slurry of $SiOC/SiO_2$ 75/25 vol % was prepared by mixing appropriate amounts of SiOC and Ludox AS 40 colloidal silica. A small amount of water was added to adjust the viscosity. The slurry was further mixed by ball milling for at least 15 hours. A slurry of $SiOC/BMAS/SiO_2$ 80/5/15 vol % was prepared likewise by mixing appropriate amounts of SiOC, BMAS and Ludox AS 40 colloidal silica and ball milling for more than 15 hours.

An inner layer was applied on a cleaned CMC substrate by painting. The coating was then dried at room temperature for 15-20 minutes until the painted coating was completely dry and heated in oven at 200° C. for at least 15 minutes to ensure complete cross-linking of the colloidal silica. Incomplete cross-linking could result in coating cracking or re-dispersion of the particles in subsequent processing steps. An outer layer was applied in the same fashion as the inner layer with the exception that the outer layer was applied with two passes. In between the two passes, a silica sealing layer was coated to reduce the porosity in the outer layer. This silica sealing layer was prepared by submerging the specimen in 50 wt % Ludox AS 40 colloidal silica solution, air drying at room temperature and cross-linking at 200° C. This sealing layer also effectively increased the overall $SiO_2$ content in the coating. After completion of the two layer bond coat, the specimen was sintered at 1500° C. for 1 hour in air.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

The invention claimed is:

1. A method of making a composite material comprising:
   mixing at least one of barium-magnesium alumino-silicate, $SiO_2$, and colloidal silica with silicon oxycarbide in a carrier fluid to form a slurry;
   drying the slurry to remove the carrier fluid; and
   curing the slurry such that cross-linking occurs in the composite material,
   wherein the mixing includes mixing barium-magnesium alumino-silicate, $SiO_2$, and silicon oxycarbide.

2. The method of claim 1, wherein the drying and the curing are simultaneous.

3. The method of claim 1, further comprising sintering the composite material after the curing.

4. The method of claim 1, wherein the carrier fluid is water.

5. The method of claim 1, wherein the drying and curing are performed for at least 15 minutes.

6. A method of making a composite material comprising:
   mixing at least one of barium-magnesium alumino-silicate, $SiO_2$, and colloidal silica with silicon oxycarbide in a carrier fluid to form a slurry;
   drying the slurry to remove the carrier fluid; and
   curing the slurry such that cross-linking occurs in the composite material,
   wherein the mixing includes mixing barium-magnesium alumino-silicate, colloidal silica, and silicon oxycarbide.

7. The method of claim 6, wherein the drying and curing are performed for at least 15 minutes.

8. A method of making a composite material comprising:
   mixing at least one of barium-magnesium alumino-silicate, $SiO_2$, and colloidal silica with silicon oxycarbide in a carrier fluid to form a slurry;
   drying the slurry to remove the carrier fluid; and
   curing the slurry such that cross-linking occurs in the composite material,
   wherein the drying and curing are performed at 200° C. for at least 15 minutes.

9. The method of claim 8, wherein the mixing includes mixing barium-magnesium alumino-silicate, $SiO_2$, and silicon oxycarbide.

10. The method of claim 8, wherein the mixing includes mixing barium-magnesium alumino-silicate, colloidal silica, and silicon oxycarbide.

* * * * *